April 30, 1946. C. B. VICKERS 2,399,269
HYDRAULIC BRAKE SYSTEM
Filed June 3, 1941 2 Sheets-Sheet 1
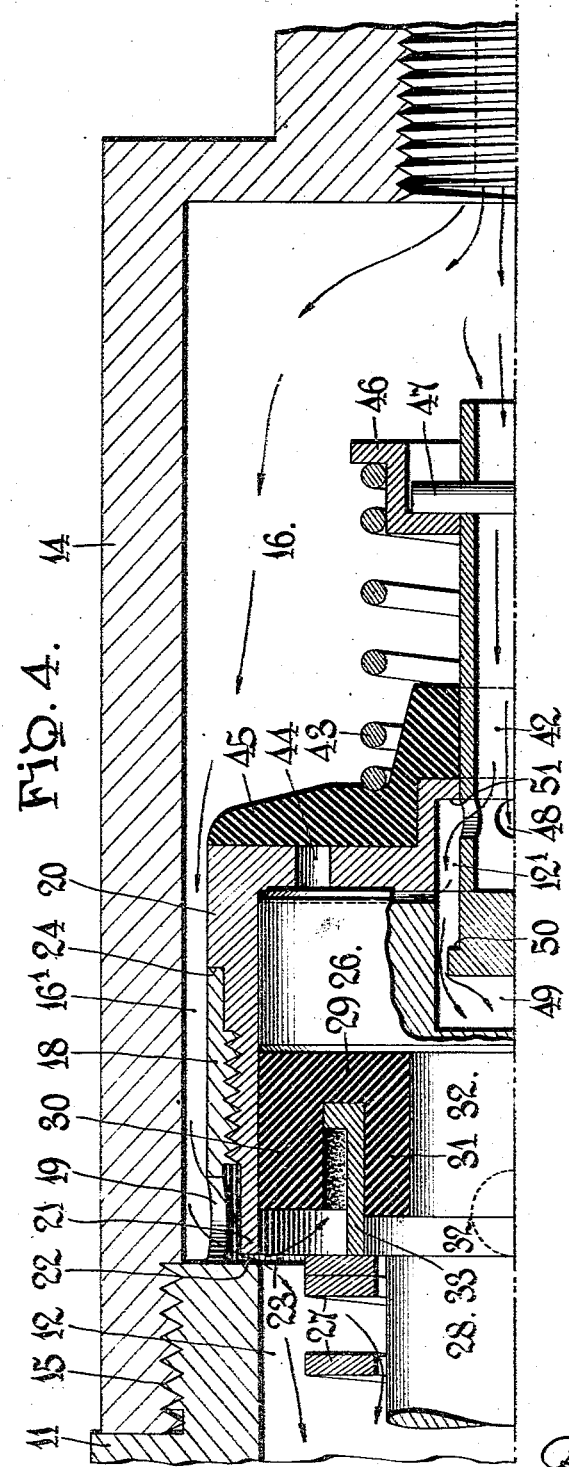
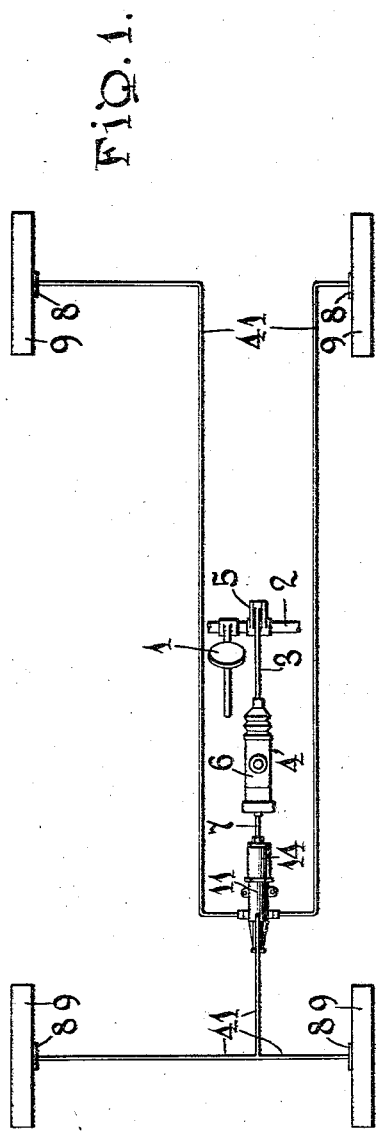
INVENTOR
Carroll B. Vickers,
BY
Beau, Brooks, Buckley r Beau.
ATTORNEYS

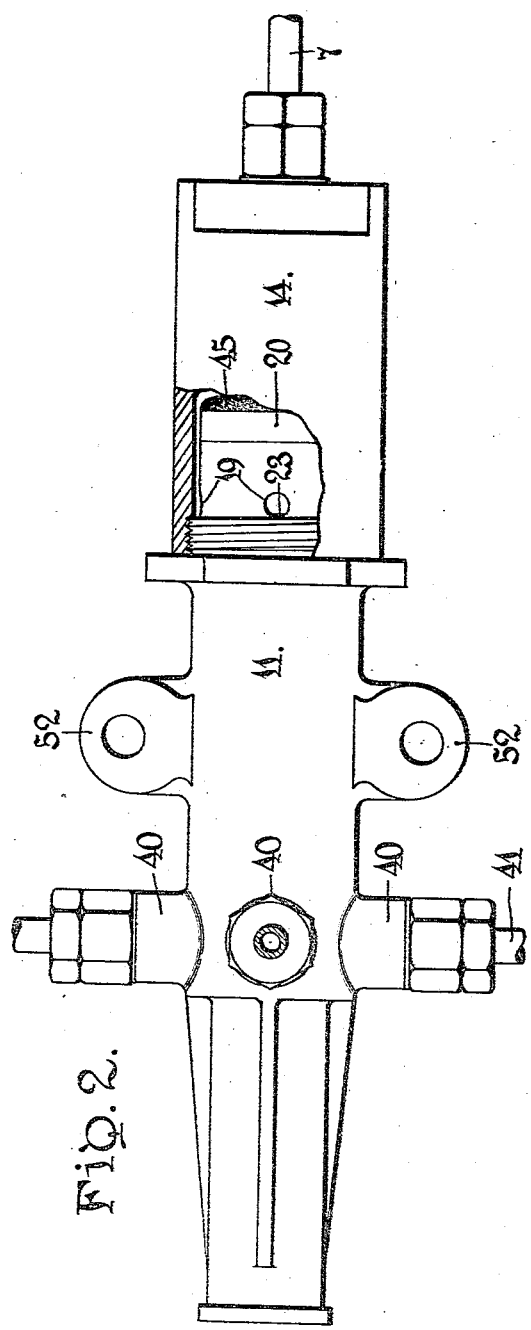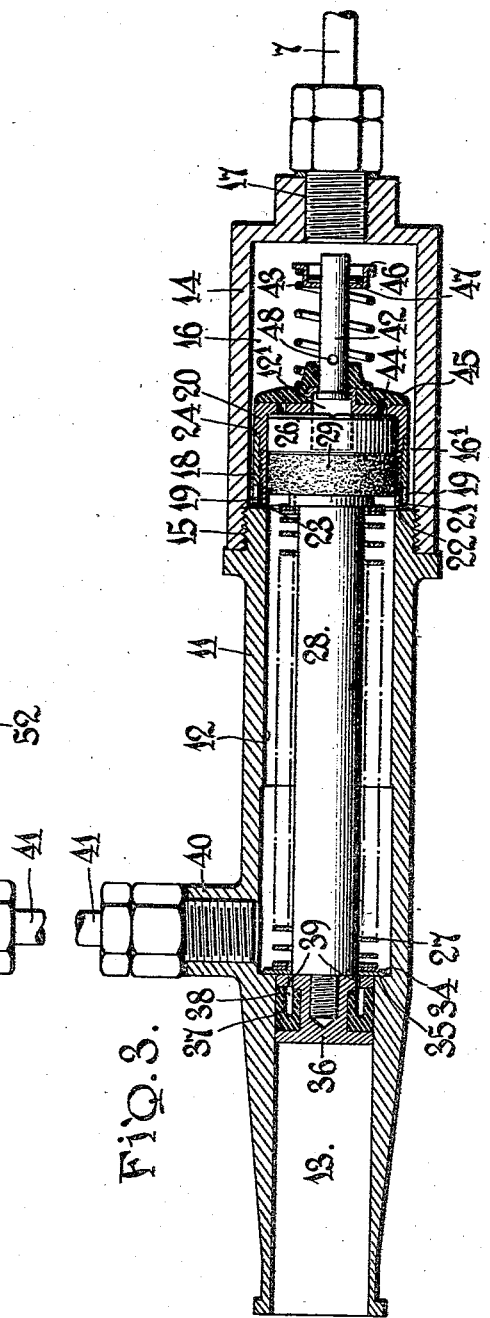

Patented Apr. 30, 1946

2,399,269

UNITED STATES PATENT OFFICE 2,399,269

HYDRAULIC BRAKE SYSTEM

Carroll B. Vickers, Buffalo, N. Y., assignor, by mesne assignments, to Timken-Detroit Axle Company, Detroit, Mich., a corporation of Ohio Application June 3, 1941, Serial No. 396,412

9 Claims. (Cl. 60—54.6)

This invention relates to a hydraulic braking system for motor vehicles and has particular reference to a hydraulic booster for use in conjunction with the master or foot controlled unit. The primary object of the present invention is to provide a booster unit of practical design and construction which will be durable and serviceable for a long period of time.

A further object of the invention is to provide a construction in which the operating parts and elements are maintained submerged in the braking liquid and are therefore kept from unnecessary wear as well as from deterioration by the weather.

The invention further has for its object to provide a booster in which the boosting piston is maintained free of the system pressure until the brake slack has been absorbed, following which such piston is subjected directly to the foot pressure independently of the braking pressure which is amplified in a novel manner as will be hereinafter more fully set forth, reference being had to the accompanying drawings, wherein Fig. 1 is a diagrammatic lay-out of the hydraulic braking system as applied to the four wheel brakes of a motor vehicle;

Fig. 2 is an elevation of the booster unit partly broken away to show the inner construction;

Fig. 3 is a longitudinal sectional view through the booster unit; and

Fig. 4 is a fragmentary sectional view of the unit on an enlarged scale to more clearly illustrate the operation thereof.

Referring more particularly to the drawings, the numeral 1 designates the conventional brake pedal which is fixed on a rock shaft 2 to which latter the piston rod 3 of a master cylinder 4 is connected by the rocker arm 5. The master cylinder may be of the usual construction having a reservoir 6 and also a discharge conduit 7 which in turn is connected to the brake cylinders 8 of the respective wheel brakes 9, all as are shown diagrammatically in Fig. 1.

Interposed in the fluid line 7 between the master cylinder 4 and the wheel brake cylinders is the booster unit which, as herein depicted, comprises a body 11 having a cylinder or chamber 12, preferably round and opening at one end through a reduced bore 13 with its opposite end closed by a chambered head 14 which is removably secured in place as by the threaded engagement 15. The pressure distributing chamber 16 of the removable head 14 has constant communication with the master cylinder through the conduit 7 to which it is connected by the threaded fitting 17. Extending from the body 11 into the chamber 16 is a cylindrical flange 18 having radial openings 19 which provide constant communication between the surrounding space 16' and the cylindrical chamber 12. The cylindrical flange 18 provides a support for a cap member 20 which is threaded thereinto and carries on its inner end a circular flange or lip 21 that cooperates with an internal shoulder 22 on the body 11 at the base of the flange 8 to form a narrow slit-like orifice 23. This orifice is of a size determined by a shoulder 24 on the cap 20 engaging the outer end of the cylindrical flange 18. The cap 20 is provided with a cylindrical chamber which is coaxial with the cylinder 12 and of equal diameter therewith so as to form an extension thereof. The full length cylinder, therefore, is interrupted by the slit-like orifice 23 which extends entirely about the cylinder 12 and has a capacity sufficient to permit the passage of ample fluid for taking up the slack of the brakes, as will hereinafter be more fully set forth.

Operating within the cylinder 12 is a movable wall or piston 26 which is normally held within the cap 20 by a spring 27 that surrounds the piston rod 28 within the cylinder 12. The piston is provided with a packing ring having an inner flange 31 and an outer flange 30, the latter sliding on the cylinder wall while the former hugs the piston rod 28 between a confining shoulder 32 and the adjacent face of the piston on which latter the packing ring seats. A sleeve 33 fits between the packing flanges to support the adjacent end of the spring 27 clear thereof whereby the packing may function properly. The opposite end of the spring finds support on a ring plate 34 seating on the shoulder 35 as formed by the reduced bore 13. Within the bore 13 extends the free end of the piston rod 28 which has a guiding head 36 with a peripheral groove in which is engaged a packing ring 37. This packing element has inner and outer flanges defining a space 38 into which the fluid from cylinder 12 enters under pressure through the orifices 39 so that the flanges effectively seal the braking liquid against leakage. The purpose of this construction is to provide a guiding support for the piston rod which is leakproof and therefore when the piston functions to apply the brakes the guiding support 36 will merely slide in the reduced bore 13 in accordance with piston movement.

Normally the piston is confined within the cap 20 with the flange 30 of packing ring 29 uncovering the slit-like orifice 23. Therefore, when the pedal 1 is depressed and the liquid in the master cylinder is subjected thereby to pressure, the pressure will be transmitted through the pipe 7, the chamber 16 and space 16', the communicating ports 19 and 23 to the liquid within the cylinder 12 from whence it is distributed through the nipples 40 and the pipes 41 to the brake cylinders 8. This transmission of pressure by the liquid is designed primarily to take up slack in the brakes and thereafter a multiplication of the pressure is effected by causing movement of the piston in a manner to entrap the liquid at the brake side thereof.

For accelerating the braking action, a metering check valve 42 is slidably mounted in an aperture in the end of the cap 20. This valve is normally closed by a spring 43 but is adapted to be opened under a predetermined pressure to establish communication between the chamber 16 and the chamber 12' which lies between the end wall of the cap and the piston 26. This end wall constitutes the back end wall of cylinder 12 and is provided with release ports 44 which are normally closed by a flap valve 45. The coil spring 43 may seat at one end on the central part of the flap valve, the opposite end of the spring being supported by a retaining plate 46 and a removable cross pin 47. The valve 42 is shown as being tubular, its bore opening axially through one end into the chamber 16 and radially through ports 48 adjacent the opposite end to provide a passage from space 16 into chamber 12'. These radial ports are normally closed to chamber 12' but are adapted to open thereinto as the valve 42 is pushed inwardly by the increasing hydraulic pressure. For this purpose the adjacent face of piston 26 is hollowed out as shown at 49 to receive the adjacent end of the valve 42. A stop flange 50 cooperating with a shoulder 51 on the cap prevents complete withdrawal of the valve by the spring 43.

The passage through valve 42 is substantially concentric with passage 16' surrounding cap 20 and these two passages lead from chamber 16, one to the space within cylinder 12 ahead of the small area working face of piston 26 and the other to the space within cylinder 12 at the rear of the large area working face of piston 26.

After the slack has been taken up by reason of the initial hydrostatic pressure which enters through the ports 19 and 23, increased pressure will cause the valve 42 to depress to a position substantially as shown in Fig. 4 wherein a communication is established through the ports 48 of the valve into the chamber 12'. Consequently, the higher pressure will act on the larger area of the differential piston which is now exposed by normally spacing the back face of the piston from the closed end face of the cap, as by providing one or the other of the opposing faces with radial grooves. With the higher pressure thus acting on the piston 26 the latter will be moved to the left as shown in Figs. 3 and 4 and during the initial piston movement the packing flange 30 will pass across the slit-like port 23 to entrap the liquid ahead of the piston for high pressure duty. The port 23 being in the form of a narrow slit will give sufficient fluid capacity for the initial setting of the brakes and at the same time will avoid injury to the packing flange as it passes thereover.

The extent of movement of the piston 26 is sufficiently great so that the piston will move beyond the slit-like port 23 to uncover the same. Consequently the valve 42 may then close under its spring urge since the foot pressure on the liquid in the chamber 16 will be transmitted through the narrow port 23 to continue its motivating force on the back face of the piston 26. This back surface area of the piston is shown as being approximately twice as great as the front face area minus the cross sectional area of the piston rod 28. The depth or width of the piston body 26 is sufficiently extensive to practically resist the slippage of any fluid across the peripheral surface after the yieldable packing flange 30 has advanced beyond the narrow port 23. The piston is preferably given a very close fit within its cylinder so as to avoid the necessity of providing a packing on the back face of the piston, which packing may be provided if desired without interfering with the practical working of the device.

Obviously the valve 42 will tend to close under the urge of its spring as the pressure is equalized between chambers 12' and 16 but further depression of the brake pedal 1 will, of course, continue to hold the valve depressed for the transmission of the pressure on the liquid in chamber 16 to the back face of the piston. This will occur until the piston moves forwardly sufficiently far to uncover the narrow side port 23 following which the valve 42 may close since the pressure in the chamber 12' will then be equalized with that in chamber 16 by reason of the communication through the narrow side port. Obviously the pressure chamber 16 may be a part of the master cylinder if desired and this of course will eliminate the fluid line 7. Therefore, the term "pressure chamber" has been used in the appended claims in such broad sense.

Upon the release of the foot pressure the spring 27 will move the piston to the right, and during this movement the valve 42 will close, but escape of the liquid from the chamber 12' will be by the ports 44 as the flap valve 45 responds to the internal pressure. Consequently the piston 26 will recede within the cap until the brakes have been released, at which time the position of the piston will have uncovered the port 23.

It will be noted that as the brakes are being applied and after slack has been taken up, the motivating pressure is then transmitted to the back of the piston at a pressure which is equal to the hydrostatic pressure at the front of the piston by reason of the port communications 23 and 48 with the common pressure distributing chamber 16. Therefore, because of this fact the change-over from the direct transmission of pressure through port 23 to the multiplying action of the booster will be smooth and regular and devoid of sudden jerks or actions which might otherwise defeat a well controlled braking application. Immediately upon making this change-over the piston will of course begin its forward travel by reason of its differential surface area and continue the braking action but under an increased pressure.

The spring 27 as well as the other parts of the booster are kept submerged at all times within the hydraulic liquid. Consequently the parts will not be subject to rust or other deterioration. The piston is held free of creeping tendency during the initial setting of the brakes because the slack absorbing pressure is acting on the front side of the piston which serves to prevent any forward motion. Thereafter the higher pressure is transmitted to the back face of the piston for starting the latter on its forward travel to first entrap the forward portion of the liquid body and then to multiply the pressure through the change in ratio between the foot pressure and the braking pressure.

The booster may be permanently mounted by means of the ears 52. For repair, access to the piston may readily be obtained by first removing the head 14 and then the cap 20 without disturbing the mounting of the body 11.

The foregoing description has been given in detail to disclose the inventive principles involved which obviously are capable of other physical embodiments without departing from the spirit or scope of the appended claims.

What is claimed is:

1. A booster for hydraulic brake systems, comprising a cylinder and a differential piston therein held in one position by a spring, a chamber normally communicating with the cylinder through a port positioned ahead of the piston but adapted to be closed thereby to entrap a portion of the liquid, said cylinder having means for communicating the entrapped liquid with a brake applying means, said piston having a rod extending from its front face and guided in a reduced axial bore of the cylinder, means for packing the rod within the bore against fluid leakage, means for subjecting the liquid in the chamber to a pressure above a predetermined degree, and means responsive to a pressure of such predetermined degree for establishing communication between the chamber and the back face of the piston to actuate the latter.

2. A hydraulic brake booster comprising a body having a cylindrical chamber and a relatively larger cylindrical flange projecting from an internal shoulder on the body, a hollow cap member fitting within the flange and forming a continuation of the cylindrical chamber, said cap member having a wall portion cooperating with the internal shoulder to define a narrow slit-like port in the side of the cylindrical chamber, a piston slidable in the chamber and normally disposed in the cap end thereof in a position uncovering the port to the chamber portion of the body, said piston having a portion movable across the port to entrap fluid in advance of the piston for braking purposes, the front end portion of the chamber being adapted for communication with a hydraulic brake applying device, the piston having an effective back face area greater than its effective front face area, and means for subjecting the chamber fluid to a brake setting pressure through the port and thereafter to subject the back of the piston to a motivating pressure.

3. A hydraulic brake booster comprising a body having a cylindrical chamber and an internal shoulder, a hollow cap member forming a continuation of the cylindrical chamber, said cap member having a wall portion cooperating with the internal shoulder to define a narrow slit-like port in the side of the cylindrical chamber, a piston slidable in the chamber and normally disposed in the cap end thereof in a position uncovering the port to the chamber portion of the body, said piston having a portion movable across the port to entrap fluid in advance of the piston for braking purposes, the front end portion of the chamber being adapted for communication with a hydraulic brake applying device, the piston having an effective area at its back greater than that at its front, a pressure distributing chamber enclosing the cap member and communicating with the port, the cap member having port means opening between the back end of the cylindrical chamber and the pressure distributing chamber, a valve slidable axially in the cap member to open the port means in the presence of a predetermined pressure in the pressure distributing chamber, a flap valve on the cap member opening the port means when the pressure at the back of the piston is relatively higher, and spring means normally holding the two valves closed.

4. A booster comprising a body having a cylinder adapted for communicating with a brake applying device, a differential piston slidable in the cylinder, a cap removably engaged with the body to confine the piston, a hollow head also removably engaged with the body and enclosing the cap, a port normally establishing communication between the cylinder at the front side of the piston and the interior of the head and adapted to be closed by and during braking movement of the piston, and valve means normally closing communication between the interior of the head and the cylinder at the back side of the piston, said valve means being responsive to a predetermined pressure on the fluid in the interior of the head to establish such communication whereby to effect movement of the piston to initially close the port for entrapping a portion of the fluid in advance of the piston and then exerting a braking pressure thereon for transmission to a connected brake applying device.

5. A hydraulic brake system unit comprising a cylinder having two ports in longitudinally spaced relation, a differential piston slidable in the cylinder and normally disposed to have one port in advance of the piston and the other port to the rear thereof, a pressure distributing chamber communicating with the cylinder through both ports, valve means normally closing the port to the rear and responsive to a predetermined chamber pressure to open the same after an initial brake setting pressure has been transmitted through the forward port, and means for subjecting the chamber fluid to pressure, the piston being subsequently movable by a pressure above such predetermined degree as applied to the back face area of the piston upon the opening of said valve means, the forward movement of the piston being sufficiently great to uncover the advance port whereby the latter will serve as a communication with the chamber for transmitting the piston moving force to the back face area of the piston.

6. A hydraulic brake system unit comprising a cylinder, a piston slidable therein, a pressure distributing chamber communicating with the cylinder in advance of the piston when in normal position, the piston having a back face area larger than its front face area, the cylinder being provided with a port to the rear of the piston through which the pressure from the chamber is transmitted to such back face area, valve means normally closing the port and responsive to the chamber pressure to open the same for such pressure transmission, and means for subjecting the chamber fluid to pressure, the forward movement of the piston uncovering such first chamber communication whereby the piston moving pressure from the chamber is transmitted therethrough in by-pass relation to the port.

7. A booster for hydraulic brake systems, comprising a cylinder having a reduced axial bore at one end, a piston arranged in the cylinder and having a rod extending therefrom into the bore, means packing the rod within the bore against leakage of liquid from the cylinder, said rod extending from the front face of the piston and serving to reduce the front area of the piston as compared to the back area and thereby providing a differential piston formation operating within the cylinder, a chamber normally communicating with the cylinder through a port positioned ahead of the piston but adapted to be closed thereby to entrap a portion of the liquid, said cylinder having means for communicating the trapped liquid with a brake applying means, means for subjecting the liquid in the chamber to a pressure above a predetermined degree, and means responsive to a pressure of such predetermined degree for establishing communication between the chamber and the back face of the piston to actuate the latter for so entrapping the liquid in advance of the piston.

8. In a hydraulic brake booster adapted to be installed between the master and wheel brake cylinders of a vehicle, a body assembly having aligned large and small diameter cylinders, the small diameter cylinder being open to the atmosphere at one end and opening into the large diameter cylinder at the other; an outlet port in said large diameter cylinder adjacent its juncture with said other cylinder adapted to be connected to the wheel brake cylinders; a guide member slidable in said small diameter cylinder and sealed against fluid leakage toward the open end of the latter; a piston slidable in said large diameter cylinder and rigidly connected to said guide member in spaced relationship thereto, for unitary sliding movement therewith, by means rendering the front face of said piston of smaller effective area than the rear face thereof; resilient means urging said piston and guide assembly toward retracted position; inlet port means in said cylinder adjacent the front face of said piston when the latter is in retracted position; a second inlet port communicating with the space in said cylinder behind said piston; means for supplying fluid under pressure to said ports, whereby said fluid may pass through said cylinder directly to said outlet port and take up slack in said brake cylinders; and means associated with said second port for admitting fluid therethrough and causing the fluid to act on the rear face of said piston when the pressure has built up to a predetermined value and advance said piston and cut off said inlet port to trap a body of fluid between said guide member and the front face of said piston and displace it endwise for delivery of a portion thereof to said outlet port under a pressure greater than said predetermined value, said first inlet port being so located as to be uncovered after predetermined advance of said piston to expose the rear face thereof to said fluid supply independently of said second port.

9. The brake booster defined in claim 8, wherein said inlet ports, and a third port communicating with the rear face of said piston are disposed in direct fluid communication with the master cylinder, and said third port embodies a check valve for automatically exhausting fluid from said cylinder upon retraction of said piston.

CARROLL B. VICKERS.